US010621607B2

(12) United States Patent
Seeger

(10) Patent No.: US 10,621,607 B2
(45) Date of Patent: Apr. 14, 2020

(54) APPARATUS, SYSTEM, AND METHOD FOR FACILITATING FAMILY-CENTRIC COMMUNICATIONS

(71) Applicant: Michael F. Seeger, Minneapolis, MN (US)

(72) Inventor: Michael F. Seeger, Minneapolis, MN (US)

(*) Notice: Subject to any disclaimer, the term of this patent is extended or adjusted under 35 U.S.C. 154(b) by 488 days.

(21) Appl. No.: 14/942,825

(22) Filed: Nov. 16, 2015

(65) Prior Publication Data

US 2016/0182615 A1 Jun. 23, 2016

Related U.S. Application Data

(60) Provisional application No. 62/167,629, filed on May 28, 2015, provisional application No. 62/079,995, filed on Nov. 14, 2014.

(51) Int. Cl.
*G06Q 30/02* (2012.01)
*H04L 29/08* (2006.01)

(52) U.S. Cl.
CPC ......... *G06Q 30/0208* (2013.01); *H04L 67/28* (2013.01); *H04L 67/306* (2013.01)

(58) Field of Classification Search
CPC .... G06Q 30/0208; H04L 67/28; H04L 67/306
See application file for complete search history.

(56) References Cited

U.S. PATENT DOCUMENTS

| 9,526,984 | B2* | 12/2016 | Thomas | A63F 13/85 |
| 2009/0030985 | A1* | 1/2009 | Yuan | G06Q 10/10 709/204 |
| 2014/0075385 | A1* | 3/2014 | Wan | G06Q 10/1093 715/812 |

FOREIGN PATENT DOCUMENTS

WO WO 2014012138 A1 * 1/2014 ........... G06Q 20/223

* cited by examiner

*Primary Examiner* — Tauqir Hussain
(74) *Attorney, Agent, or Firm* — Thomas J. McWilliams; Barnes & Thornburg LLP

(57) ABSTRACT

The present invention includes a computer-based Internet-enabled apparatus, system, and method for facilitating family-centric communications. The system includes a networked user terminal that presents to a user a family-centric user interface, accepts user input, and sends the user input to a server. The server includes a plurality of predefined modules, each with respective preconfigured security conditions and rules. Together the modules are arranged to mimic a family household and facilitate family activities including the gamification of everyday tasks or events. The server receives the user input, and stores and manages it in accordance with the security conditions and rules of a select module security conditions, including providing reminders and alerts to family members.

10 Claims, 22 Drawing Sheets

※ Every family's routine is unique - FLAyK assists you in managing your daily and weekly routine ※ Every family's routine changes and the need to alert your family of these changes becomes critical - FLAyK breaks through the noise of social media and insures you reach your entire family, including teenagers ※ Every family likes to share, but not with the entire Internet - FLAyK insures that what happens within your family, stays in the family

FIG. 3

❈ NOT clunky – simple and intuitive
Straightforward Navigation 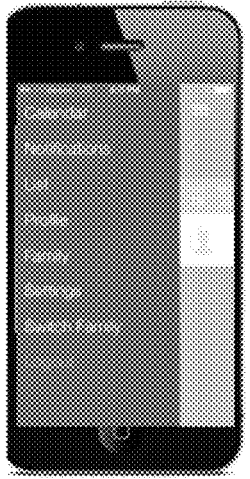
Effortless UX 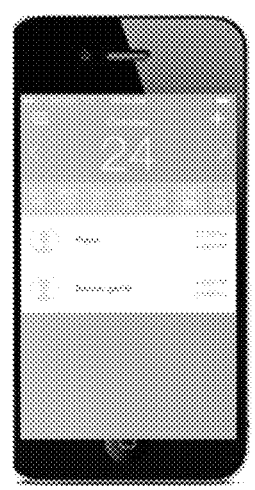
Easy Event Creation 
FIG. 6

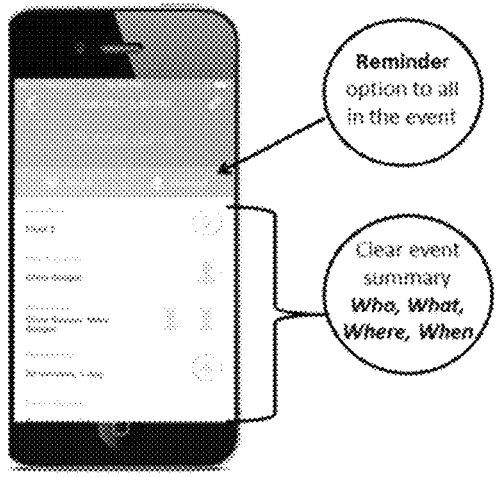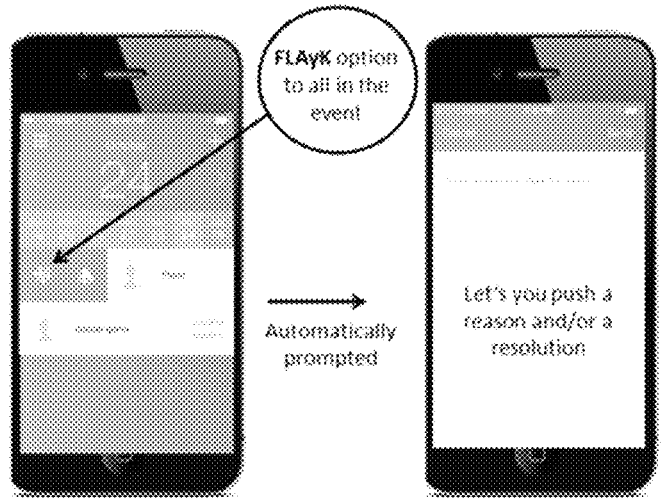
FIG. 7

Uncomplicated lists
* Lists can be 'divide & conquer'
* List can be recurring
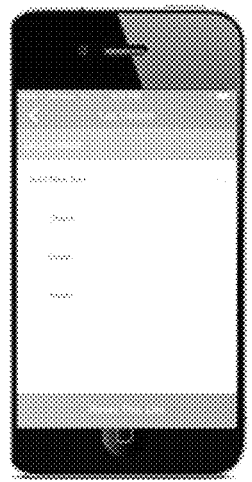
Relevant Notifications
* Lets you opt out of not relevant information
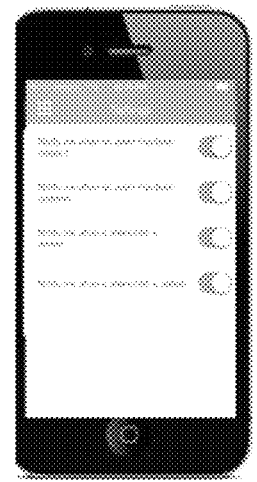
FIG. 9

Rewards Administrator
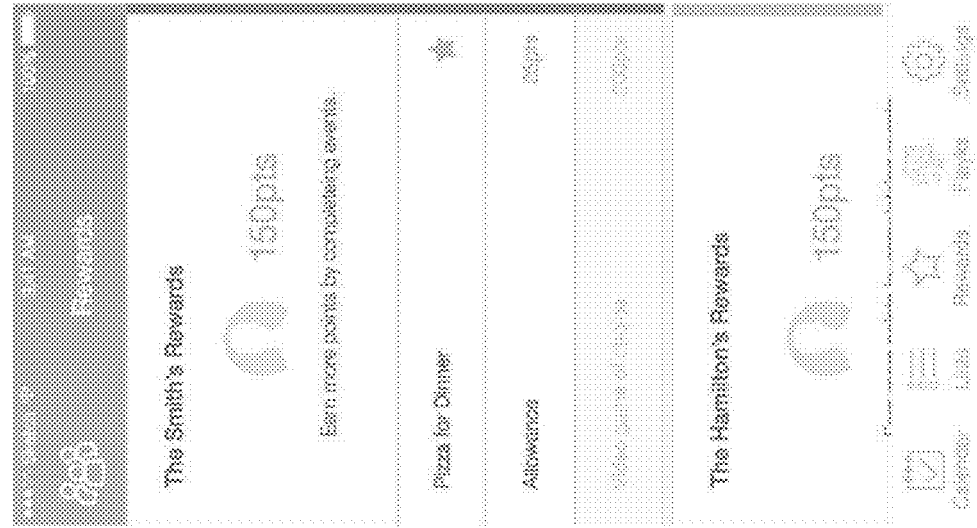
Rewards
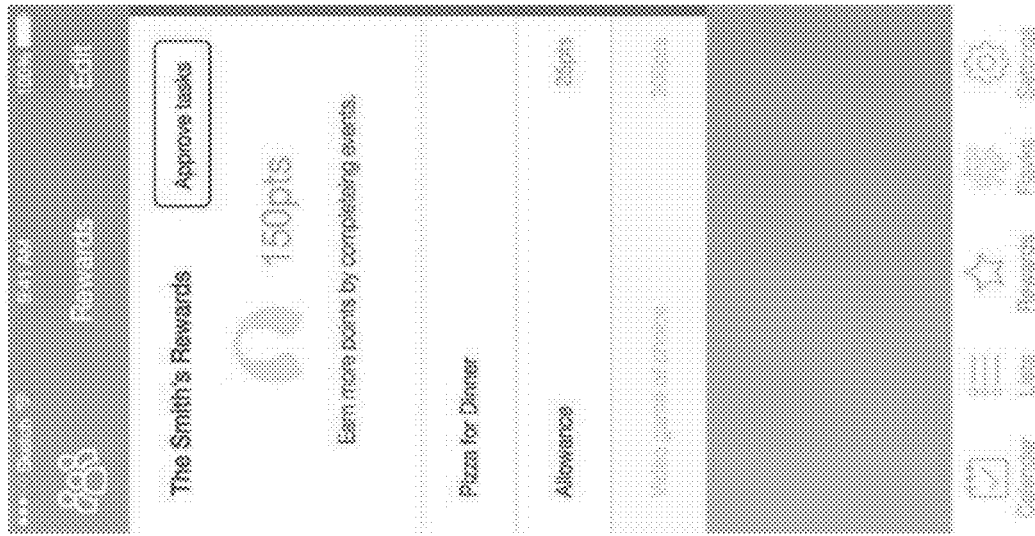
FIG. 10

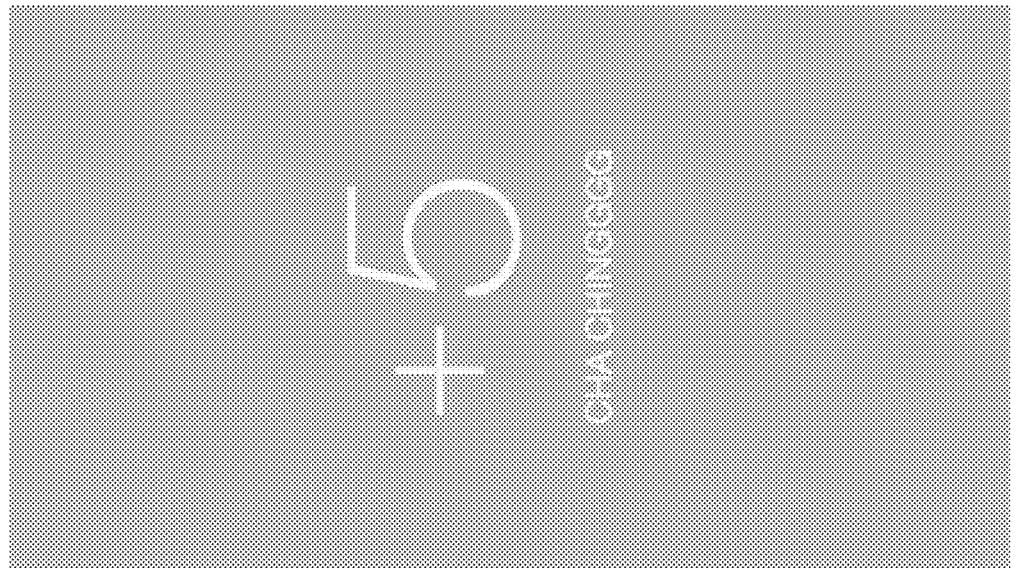
Points Earned
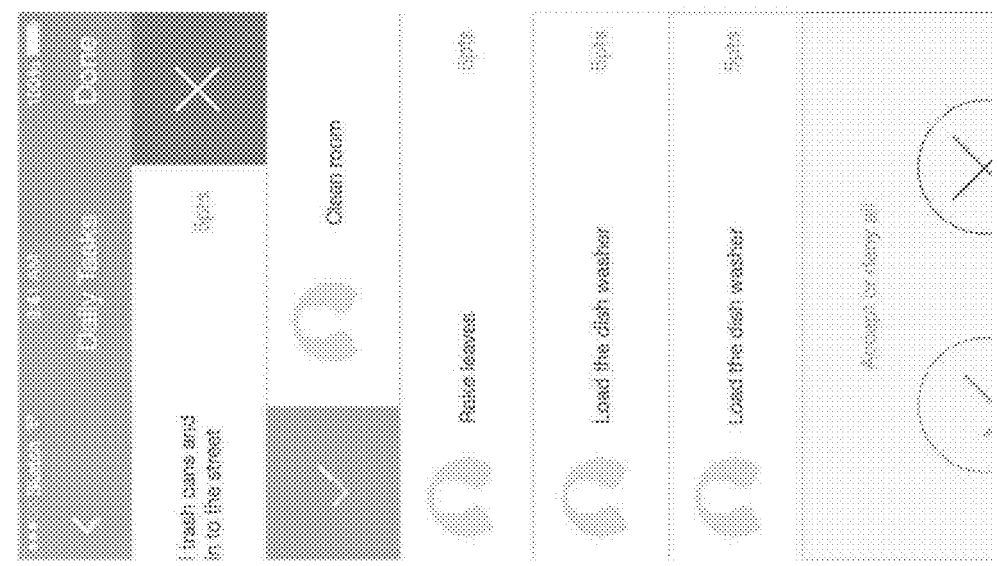
Daily task completion
FIG. 11

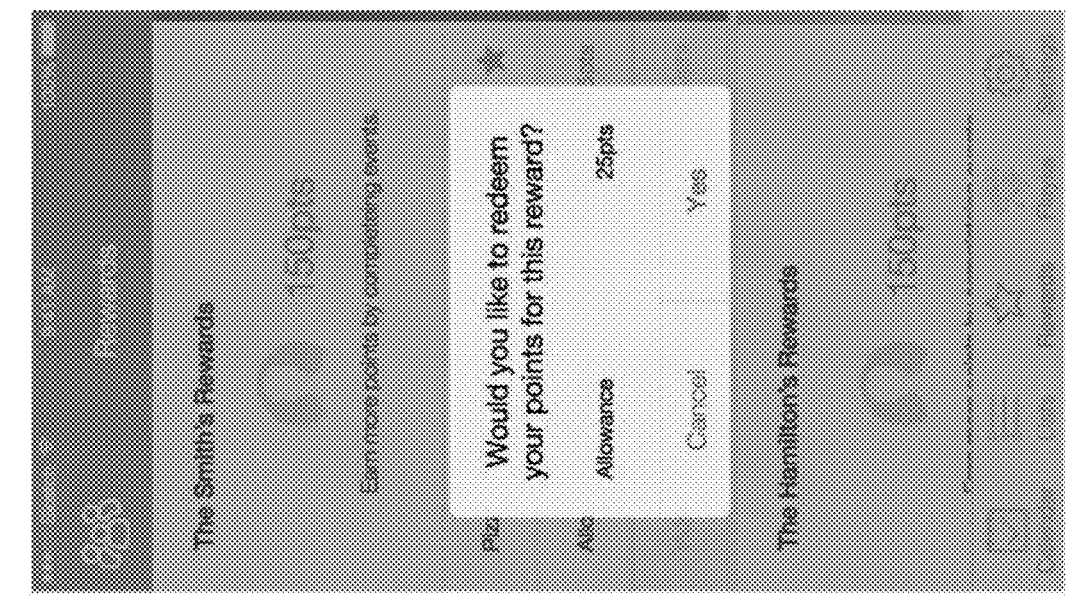
Claim Reward
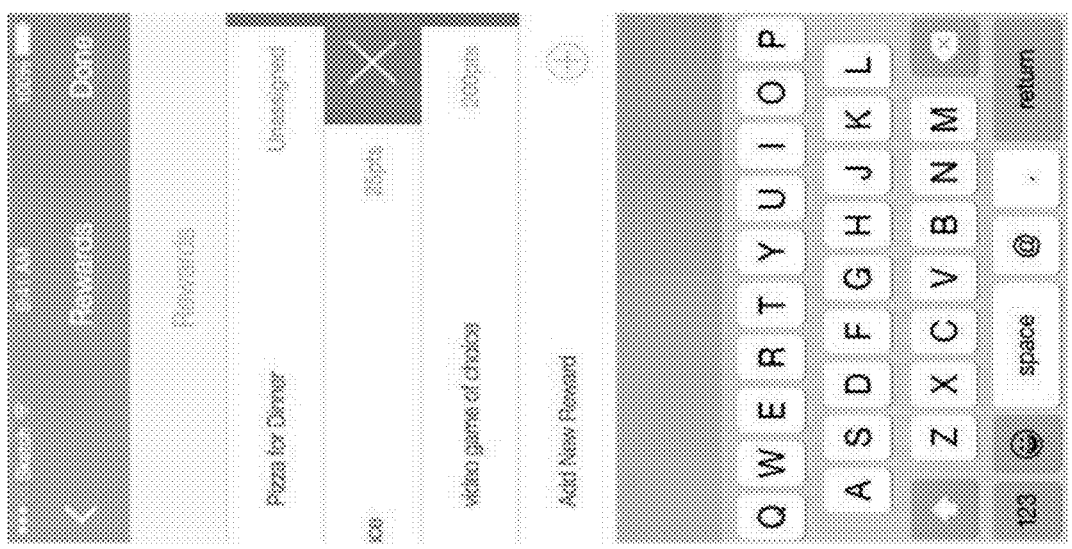
Create / Edit Reward
FIG. 12

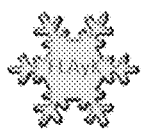
FIG. 17

APPARATUS, SYSTEM, AND METHOD FOR FACILITATING FAMILY-CENTRIC COMMUNICATIONS

CROSS-REFERENCE TO RELATED APPLICATIONS

The present claims priority to U.S. Provisional Patent Application Ser. No. 62/167,629, filed May 28, 2015, and to U.S. Provisional Patent Application Ser. No. 62/079,995, filed Nov. 14, 2014, the entireties of which are incorporated herein by reference.

BACKGROUND OF THE INVENTION

Field of the Invention

The present invention is directed to a computer-based internet-enabled platform, and more particularly to an apparatus, system, and method for providing select Description of the Background A social network is a computer-based world wide web-enabled platform for providing users with automated social communications facilities accessible to, and/or with links to, other similar facilities. Such a facility may be referred to as a "page," for example a so-called FACEBOOK page, which is an individual- or single identity-centric facility with certain automated functional mechanisms, accessible to other FACEBOOK pages set up by other individual users. Some social networks operate to establish and support social relations among people who share interests, activities, backgrounds, or other real-life connections, such as a community or other topical forum. Thus, existing social networks are arranged to serve individuals, or to serve groups set up by users.

In a typical social network, a user may register and set up an account with the platform, typically secured by a user ID and password set by the user. The user account often includes a user profile comprising user information provided by the user. The user may identify social acquaintances that have set up similar accounts, and may allow some level of access to the user's own account by those acquaintances' accounts. Further, a portion of a user's information may be publicly accessible and searchable from the public Internet without any restrictions.

Social networks generally enable certain services to their registered users, such as uploading photos or videos, maintaining a blog, using private or public chat spaces, and the like. A social network service generally exists as a world wide web-hosted computer-based service, accessible from a web browser on a user terminal. A social network service may also use or be enabled by an application (app) running on the user terminal, such as an app running on a smart phone or tablet, or the like. Social network services are varied and may provide the ability for users to interact over the Internet, such as via instant messaging, e-mail, video conferencing, and the like. Services may include mobile connectivity, streamlined uploading and sharing of photos, videos, comments, and blogging, and many other capabilities. Thereby, sites allow users to share ideas, pictures, posts, activities, events, and interests with people in their personal network.

Social networks exist that emphasize or are dedicated to certain categories, such as connecting with former classmates, identifying and reaching out to distant relations, topical recommendation and opinion sharing platforms, and the like. A single platform may combine many such services. Currently, the largest social networks in the United States include FACEBOOK, GOOGLE+, YOUTUBE, LINKEDIN, INSTAGRAM, PINTEREST, and TWITTER; and there are many others.

Notably, existing social networks are generally focused on providing communication mechanisms and services to individuals or to entire communities. However, there are no social networks or services that easily, conveniently, and effectively provide for the specific needs of today's busy families.

SUMMARY OF THE INVENTION

A computer-based Internet-enabled platform for delivering select predefined family-oriented communication mechanisms and services focused on families is disclosed. The system includes applications and routines (collectively "apps") executable locally on user devices such as personal computers, tablets, and smartphones, arranged to intercommunicate via the Internet or other network, such as a secure private network. The apps may concurrently or alternatively be hosted to execute on a remote computer, such as an application executing in an Internet cloud and provided as a service to users, or to operate cooperatively on both a user terminal and a remote computer in the cloud.

The apps allow a user to set up, access, and allow others to access a plurality of predefined, preconfigured online virtual workspaces. The workspaces may reside on a computer such as a server in the Internet cloud, or may be distributed among a plurality of devices, such as user devices with continuous or discontinuous access to the Internet or other common network. Access to each workspace may be provided to users assigned to respective predefined family-centric classes by an administrative user such as a parent, each class having respective predefined permissions.

In an embodiment, a system user may register a family entity of a "nuclear family" class. The family entity may be provided by the system with a default selection of predefined, preconfigured nuclear family workspaces, each workspace preconfigured to facilitate certain respective common nuclear family functions and activities. Members of the nuclear family may be registered as members of the established family entity. As such they may have unrestricted access to the nuclear family workspaces.

One or more of the nuclear family members may also be established as a "nuclear family member" user with unrestricted access to at least one of their own predefined, secure and personal "nuclear family member" workspaces, preconfigured to facilitate common individual family-member functions and activities, with optional oversight and control permissions assigned to a parent or the like.

Extended family members may be assigned to an "extended family" class in relation to the nuclear family. Additionally, families that are divorced or include interaction with their children now living with a separate family may be assigned an "other family" class in relation to the nuclear family. A variety of other family arrangements may also be accommodated, such as so-called "modern family" arrangements with parents of the same gender, or a family that includes more than two parents of children, all living together as a single family unit. As such, individual family members may have predefined restricted access to one, or more than one, nuclear family workspaces. Each nuclear family workspace may also be preconfigured to facilitate respective common extended family activities. The extended or other family members also belong to their own respective real world nuclear families, and may also register their own nuclear family units with themselves as members of that nuclear family. They would then have full access to their own nuclear family workspaces; and access to those workspaces would be restricted with regard to the extended family relative to that nuclear family.

Non-family members may have restricted access to one or more of the family workspaces, which may also be preconfigured to facilitate common non-family activities.

In an embodiment, the user classes may be arranged in a predefined, preconfigured hierarchy of access rights. The system protects user privacy by providing members of each class with full access to their own resources, while providing only restricted access to those resources by members of less private classes. Thereby, members of each class may be given a predefined subset or superset of access rights to respective resources of other classes to facilitate common and familiar interactions between persons of different classes. Each workspace may provide use of a respective predefined set of applications to facilitate a selection of common family-oriented activities, capabilities and services. Thereby, the social needs of the family as a whole are provided for and facilitated in a manner that mimics common expectations of privacy in conventional family-centric interactions.

It is to be understood that both the foregoing general description and the following detailed description are exemplary and explanatory and are intended to provide further explanation of the invention as claimed.

BRIEF DESCRIPTION OF THE FIGURES

The drawings illustrate exemplary embodiments and/or aspects of the invention and, together with the description, serve to explain the principles of the invention, the scope of which is determined by the claims.

In the drawings:

FIG. 3 illustrates aspects of an exemplary embodiment in accordance with the herein disclosed systems and methods.

FIGS. 6-12 illustrate different GUI interfaces of the present invention.

FIGS. 13-17 illustrate aspects of exemplary embodiments in accordance with the herein disclosed systems and methods.

DETAILED DESCRIPTION OF THE INVENTION

Figure 1:
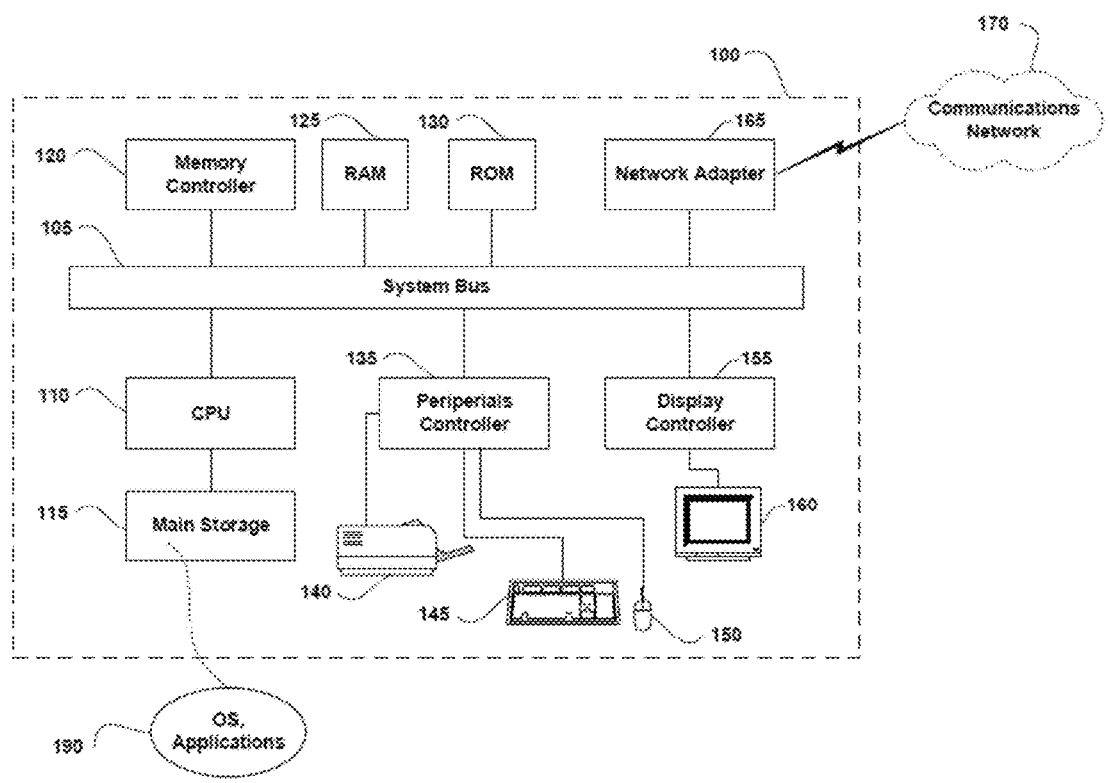
FIG. 1 is a block diagram of an exemplary computing device that may be used as a user terminal or server in the herein disclosed systems and methods.

It is to be understood that the figures and descriptions provided herein may have been simplified to illustrate elements that are relevant for a clear understanding of the disclosed embodiments, while eliminating, for the purpose of clarity, other elements found in typical systems and methods in the prior art. Those of ordinary skill in the art may recognize that other elements and/or steps may be desirable and/or necessary to implement the devices, systems, and methods described herein. However, because such elements and steps are well known in the art, and because they do not facilitate a better understanding of the disclosed embodiments, a discussion of such elements and steps may not be provided herein. The present disclosure is considered to inherently include all such elements, variations, and modifications to the disclosed elements and methods that would be known to those of ordinary skill in the pertinent arts.

For many families, managing the family's schedule and the logistics of such has grown increasingly complex, with the demands of the parents' workplace and home responsibilities colliding with the demands of their children's overloaded activity calendars. Existing social media platforms do not adequately support the needs of families in such circumstances. Furthermore, there is a growing aversion to certain aspects of traditional social networking. For example, there is an increasing objection to lack of control over personal information, and widespread distaste of oversharing of personal or insignificant information by an artificially large group of "friends" or other contacts. This situation has resulted in a need for a more tightly defined and controlled social network devoted to the needs of families. The disclosed social network embodiments are simple for users to use. A family is provided with a predetermined selection of modules, each module preconfigured with capabilities designed to support family-centric activities, communications and interactions. In embodiments, the predetermined and preconfigured aspects of the social network may not be modified by users. In other embodiments, at least some of those aspects may exist as default selections that may be modified by users and adapted by them to their own circumstances and preferences.

In particular, apparatus, systems, and methods are disclosed specifically designed to better manage and facilitate activities, communications, and interactions between family members as a family-centric social network. The system provides logistical support, such as calendar-type management for the family members' regularly and other scheduled events, as well as means for streamlining the family's response to unanticipated and unscheduled events. For example, the system may provide reminders to participants of scheduled events; and may also provide alerts to all participants in the case one of them is unexpectedly unable to take part (such as a parent who is expected to provide transportation to an event but is caught in a traffic jam). The disclosure includes message delivery mechanisms that avoid or mitigate the communication clutter typified by prior art social networks. For example, the disclosed social network provides mechanisms that support the needs of the members of a family unit when the tightly scheduled environment they operate in is thrown into chaos by unanticipated events, such as notification to family members affected by the unexpected change.

A plurality of predefined, preconfigured modules may be provided by the family-centric social network upon registration of a family on the network, each metaphorically representing a respective virtual workspace or "room." The rooms may be pre-arranged to mimic certain typical family expectations, such as expectations of privacy, commonly associated with particular rooms in a home. For example, a default selection of rooms may be pre-configured to facilitate communications and activities that commonly occur in those rooms.

The default selection of "rooms" may be modified by a family to better serve their needs, or can be automatically adapted to the family as appropriate family information is provided. For example, in a default configuration separate bedrooms may be set up for each family member, including each child and each parent. However, the default arrangement may be modified in accordance with the actual sleeping arrangement of the family, such as a first bedroom shared by the parents, a second bedroom shared by boy children, and a third bedroom shared by girl children, or variations thereof. There may be a preferred arrangement of modules if it mirrors the family's actual living arrangements, because it takes advantage of certain expectations the family members may already have developed. That aspect may be enhanced if the real-world family situation is reflected as they set up their family presence on the network.

In an embodiment, the metaphor of the family home may be reinforced with a log-on screen or screensaver displayed to nuclear family members. For example, it may be displayed as a "house" schematic arranged to match the family's real-life footprint. An initial registration procedure for a family on the network may include a default selection of modules. The initial modules may include a private bedroom area for each family member for storing private files, a kitchen that is shared by the nuclear family, and a family room that is accessible to the extended family, all of which may be preconfigured to be secured against access by the public and protected against searching by search engines. The initial modules may also include a virtual common area (such as might be served by a front porch, for example) that may be accessible by the public and searchable by search engines. The common area may include, for example, the address of the family home, a shared home phone number, a family photo, and the like.

Each module may be configured by default, and optionally modified by user selection, to interact in certain predefined aspects with other modules. For example, a virtual kitchen may be configured to enable pushing certain "kitchen" events into a virtual living room, where they may be shared with the extended family. In addition, different modules may have module-specific apps available by default or by selection. These and other predefined aspects of each room may have preconfigured default settings, some or all of which may be modified by users to suit a family's preferences.

Thus, in a particular illustrative embodiment of a virtual family home, a default module may metaphorically represent a family's "kitchen". The kitchen may include by default, or be set up in accordance with a user selection, an app for keeping recipes organized. The app may include an assortment of pre-selected recipes, and may also allow for adding recipes. The app may provide for sorting and filtering recipes, and may also include a mechanism to adapt a recipe to a select number of servings. The kitchen may also be provided by default or user selection with a shared family calendar app that family members can use to keep their respective schedules organized. The calendar app may be preconfigured or configured by a user to highlight overlapping events from different family member calendars, as a logistical aid. The calendar may also be configured to send reminders prior to certain events in accordance with user selections. The calendar app may be preconfigured or configured by a user to send notifications to family members when conflicts arise around certain events that result in a need for logistical problem solving (e.g., a parent is unable to pick up children at event as expected due to change in work schedule). The kitchen may provide a "family discussion" app that mimics discussions around the kitchen table. The discussion app may include mechanisms like shared video conferencing among a selection of user devices such as PCs and smartphones, such that the family can have a regular discussion even if they can't physically meet, such as due to a parent travelling for work, for example. In an embodiment, the kitchen communications may be shared among nuclear family members, but not shared with anyone else, as private family discussions. Alternatively, a mechanism may be provided to invite visitors to join a particular discussion, or to be included in accordance with a schedule.

Another default module of this illustrative embodiment may represent a "living room." The virtual living room may be configured by default to facilitate certain activities and events among nuclear family members, and to share certain aspects of events with others. For example, an event may be set up by default to include mechanisms for handling invitations, confirmations, relevant lists, links for directions to the event location and reminders to a planned event; for facilitating uploading photos and commentary after the event; of the events, photos and comments to the extended family; for receiving and posting feedback and comments from the viewers, and the like. In the living room, photos and comments regarding a completed event may be shared with the extended family (grandparents, aunts, uncles, etc.). Thus, the virtual living room offers a nuclear family the ability to communicate with its extended family in a secure and intimate virtual environment, while serving as an interactive social networking site centered around the family. Thereby, extended family members may be kept up to date by connections to each other's living room events, thereby fostering closer relationships with relatives who previously would have been at risk of being off put, or overwhelmed by details of the family's day-to-day events.

In this illustrative embodiment, a virtual bathroom may be included by default or by user selection. The bathroom may, for example, store prescription refill information and be set up with reminders that are automatically triggered when refills should be ordered. Related functionality can include links to preferred pharmacies, links to doctors' and dentists' offices, and the like. Links may also be provided to the family's insurance providers and any healthcare-related mechanisms they may provide.

In an illustrative default configuration, a kitchen module may be provided with a recipe app, a calendar and logistics app shared by family members, and a discussion app to facilitate shared family discussions. The default configuration may include a living room with an app to facilitate events and in which information of important events may be shared with the extended family. The default configuration may include private bedrooms for individual family members with secure access to maintain the privacy of uploaded information. The default configuration may include a common area accessible to the public. Other modules may include a virtual attic for long-term storage of photo albums and other archives; a virtual home office that provides for online banking and bill payment, etc.

As noted, each room of the virtual home may be set up by default to allow a predefined level of restricted access by users of different classes. For example, full access may be provided to the living room for nuclear family members, but only restricted access to the living room by extended family members such as to certain predetermined and preconfigured functions and areas. In an embodiment, no access at all to the living room may be provided to the general public. The arrangement of the family presence on the network is thus immediately intuitive and familiar because it mimics the way family matters are managed in real life.

In an embodiment, software applications may be downloaded to or accessed by user terminals. Furthermore, hooks may be provided for accessing features of other social networking sites and tools. For example, if a user has a FACEBOOK page already set up, with relationships and information already entered, a transcoder may be provided to retrieve from the FACEBOOK page information that may be used by the present system. Further, a mechanism may be provided that logs into a user's FACEBOOK page from within the system, and populates their FACEBOOK page with information entered via the disclosed system. In this way, it is contemplated that the disclosed system may become the user's preferred social networking platform, providing both family-centric capabilities and dynamic access to other social networks.

In an embodiment, a frame may be provided on a user's desktop, such as a docked or floating frame that may be maintained in front of any other applications that may be running. This arrangement allows users to monitor family events (updates, messages, and the like), and to share content with friends without ever leaving the application they happen to be using. Client apps may also be provided for mobile devices such as ANDROID or IOS based smartphones and tablets, downloadable from an app store, or the like. The apps may simplify uploading files such as photos and videos to a select private or family-accessible album on the system servers. Thereby, features and functions of the system may be bound to, or made easily accessible from, other unrelated applications and services.

For example, an impromptu video chat session may be launched from the foreground frame even while working in another application like a word processor, such as for a quick family conference. The system may thus integrate with, or remain available from, other apps and services so simply that leaving the other app or service becomes unnecessary. In this manner, it is contemplated that the system may win users away from other social networks. Because most people are unlikely to devote time to more than one social network, the system may become its users' primary social network because it focuses on the most important relationships and activities, the family, while providing links and easy access to any other social network presence a user may have.

One aspect of conventional social networks that people are becoming increasingly aware of is that large companies like GOOGLE and FACEBOOK collect the data they enter online, and use it to target ads or sell it to third parties. In particular, recent media coverage of FACEBOOK's notoriously poor stewardship of personal data and lack of respect for users' privacy has drawn user attention to the largely hidden ecosystem of companies that collect, buy, sell, and trade in personal data. For example, it is well known that FACEBOOK makes a user's name, gender, profile picture, networks, friends, "Likes," "wall posts," photos, and profile details public by default, which makes those facts about users searchable. Users are increasingly uncomfortable with what they perceive to be unwarranted invasions of their privacy.

Accordingly, in the present system the privacy of user-entered and uploaded information and files is defined by the module in which it is entered. If entered into a module that is set up by default with user-only access, it remains unsearchable and inaccessible to other users. Similarly, if entered into a module that is set up by default to be accessible to others, such as nuclear family, extended family, friends, or the public, then only the respective intended audiences have preconfigured, class-specific access to the entered information. Moreover, each user maintains full control over all of the information they respectively provide to the system and within the system.

Notably, in some social networks it is difficult or impossible for a user to delete their personal uploaded data if they decide to quit the service. In the present system, each user remains in control of all of their information and files. They may modify, retrieve, move, or delete from the system any and all information they may have provided. In an embodiment, the system provides assurances to users that it does not maintain user information that has been removed by the user. Furthermore, in the case the user wants to remove some or all of their information, the system may provide means whereby they may do so simply and easily. Moreover, the system may be set up by default to provide for automatic backups, while giving control over those backups to the respective users.

Thus, the herein disclosed apparatus, systems, and methods provide to a user with a networked user terminal the ability to streamline the organization, communication, and management of activities and events that may have an impact on other members of their family. Users are identified to the system as belonging to one of a plurality of predefined classes relative to the family, including individual nuclear family members, the nuclear family as a unit, the extended family, friends, and the general public. Thereafter, with a user terminal, the user may access the system, enter and modify information, share the information they entered with other users of the system, and obtain information of other users from the system all without the concern as to how far beyond their desired level the information has been viewed or distributed.

Turning now to the figures, FIG. 1 depicts an exemplary computing system 100 that may be used in implementing the herein described apparatus, systems, and methods. Computing system 100 is capable of executing software, such as by providing an operating system (OS) and a variety of executable computing applications, or "apps," 190. The operation of exemplary computing system 100 is controlled primarily by computer readable instructions, such as instructions stored in a computer readable storage device, such as hard disk drive (HDD) 115, an optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, mobile devices, and the like, CPU 110 is implemented in an integrated circuit called a microprocessor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Information, such as computer instructions and other computer readable data, is transferred between components of computing system 100 via the system's main data-transfer path. The main data-transfer path may use system bus architecture 105, although other computer architectures (not shown) can be used, such as architectures using serializers and deserializers and crossbar switches to communicate data between devices over serial communication paths.

Memory devices coupled to system bus 105 can include random access memory (RAM) 125 and read only memory (ROM) 130. Such memories include circuitry that allows information to be stored and retrieved. Data stored in RAM 125 can be read or changed by CPU 110 or other hardware devices, whereas data stored ROM 130 generally cannot. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes.

In addition, computing system 100 may contain peripherals controller 135 responsible for communicating instructions using a peripheral bus from CPU 110 to peripherals, such as printer 140, keyboard 145, and mouse 150. An example of a peripheral bus is the Universal Serial Bus (USB) bus.

Display 160, which is controlled by display controller 155, can be used to display visual output generated by computing system 100. Such visual output may include text, graphics, animated graphics, and/or video, for example. Display 160 may be an LCD-based display, touch-panel or touch display, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide for access to and tracking of the data discussed herein. Communications network 170 may provide a user of computing system 100 with means of communicating and transferring software and information electronically. The network interface may be wired, such as an Ethernet or cable connection to a wired network, or may be wireless, such as an air interface to a WiFi or cellular network. Additionally, communications network 170 may provide for distributed processing, which involves several computers and the sharing of workloads or cooperative efforts in performing tasks. It is appreciated that the network connections shown are exemplary and other means of establishing communications links between computing system 100 and remote users may be used.

It is appreciated that exemplary computing system 100 is merely illustrative of an exemplary computing environment in which the herein described systems and methods may operate and does not limit the herein disclosed systems and methods. Rather, computing environments having differing components and configurations may be used. That is to say, the inventive concepts described herein may be implemented in various computing environments using various components and configurations.

Figure 2:
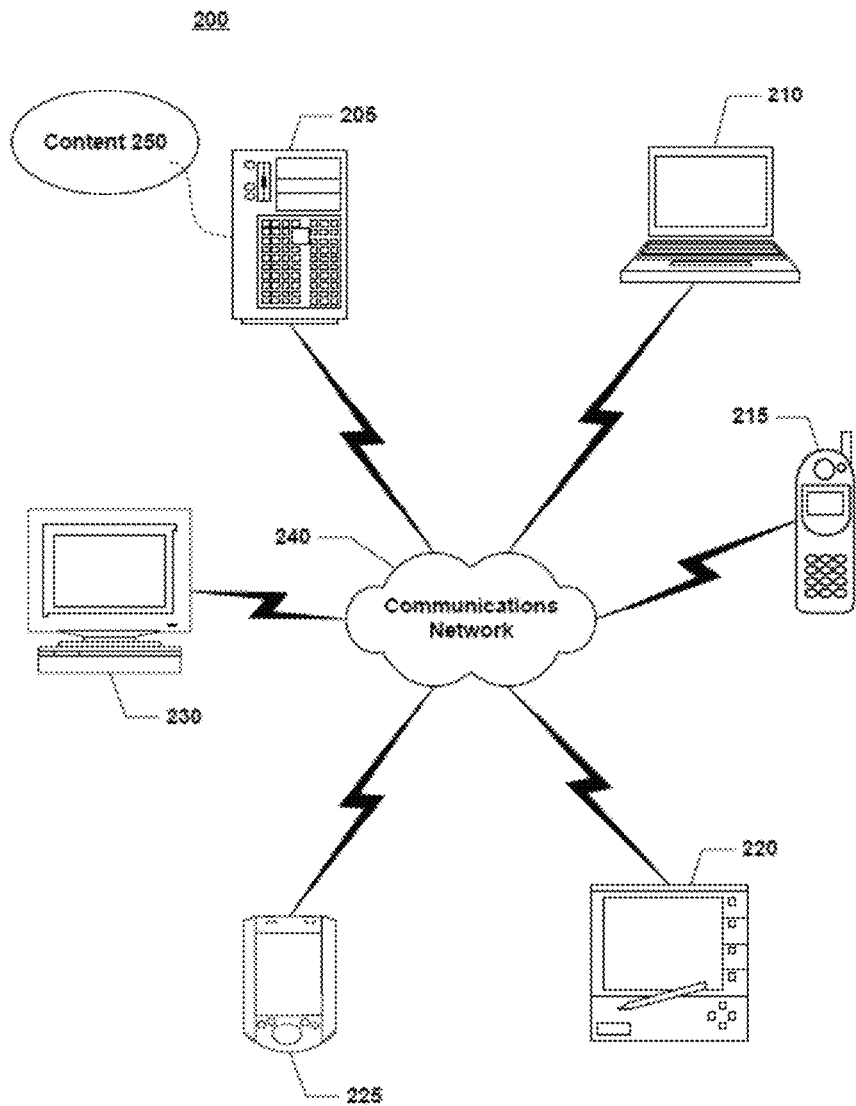
FIG. 2 is a block diagram showing a plurality of networked user terminals and a server that may be employed in the herein disclosed systems and methods.

Computing system 100 may be deployed in networked computing environment 200 such as that shown in FIG. 2. In general, aspects of the above description for computing system 100 may be applied to server, client, and peer computers and user terminals deployed in a networked environment as shown. For example, server 205, laptop computer 210, mobile telephone 215, tablet computer 220, and smart phone 225, and personal computer (PC) 230 may each include and/or share some or all of the apparatus shown in FIG. 1. FIG. 2 thus illustrates an exemplary networked computing environment 200, including a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, tablet computer 220, smart phone 225, PC 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), and independently developed applications, to interact with server 205.

The server 205 may thus deliver and/or or communicate via applications specifically designed for the client devices. Client devices may any of a plurality of operating systems. Such operating systems may include, for example, Windows, Android, Apple iOS, Symbian, RIM Blackberry OS, Palm webOS, and Linux. Illustratively, mobile operating systems and applications may be programmed in any appropriate programming language, such as C, C++, Java, and/or .NET, for example.

The network interface of the user terminal may be wired, such as an interface to an Ethernet network compliant with IEEE 802 network interface standards, or may be wireless, such as air interfaces to cellular voice and data or Wi-Fi networks. The user terminal may be a mobile device such as a smart phone, tablet, portable computer, personal desktop computer, or the like. The communication network may be or include portions that are private or public, and may include communication over the Internet.

In embodiments, the server may be arranged to interface with one or more other networked systems such as other social networks, for example to enable users to easily access their online presence on the other networks.

Figure 4:
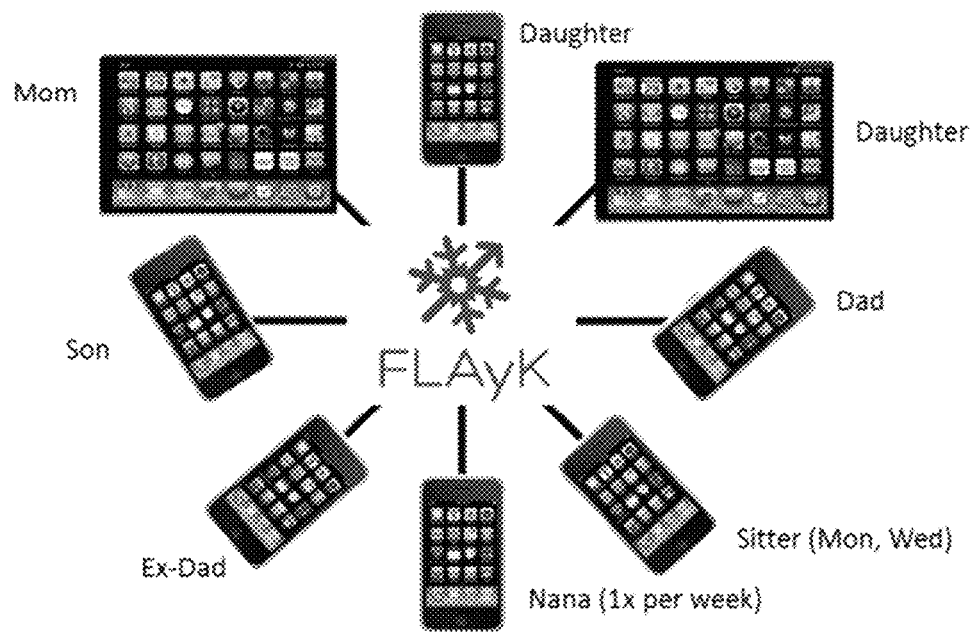
FIG. 4 is an overview of a plurality of exemplary devices utilized by the present invention.

FIG. 3 is illustrative of a moniker for the system based on the major types of functionality if provides. That is, the system provides family-centric logistics management (such as coordination of family member schedules, management of events, etc.). The system also provides alerts to family members, such as reminders of upcoming scheduled events, or alerts to other pre-selected family members upon the occurrence of an unplanned event that may impact a planned event or logistical support assigned to scheduled events. Such alerts and other communication mechanisms are provided by the system. For example, the system may provide for communication via one or more of text messages, emails, phone calls, video calls, and any other communications mechanism. The system also provides for restricted access to its facilities, mechanisms, communications, and the like. FIG. 4 is a graphic illustrating that the system facilitates interactions between family members. As shown, a family may be defined to include members of a traditional nuclear family (mom, dad, daughter, son). In addition, a selection of predefined but non-traditional family members may also be provided for (ex-dad, nana, sitter), each with one or more aspects that are characteristic of each such non-traditional family member, and preconfigured to facilitate common interactions between the traditional and non-traditional family members. In an embodiment, the traditional and/or non-traditional aspects may by adapted by a user to include features that mimic real world attributes of the user's actual family.

Figure 5:
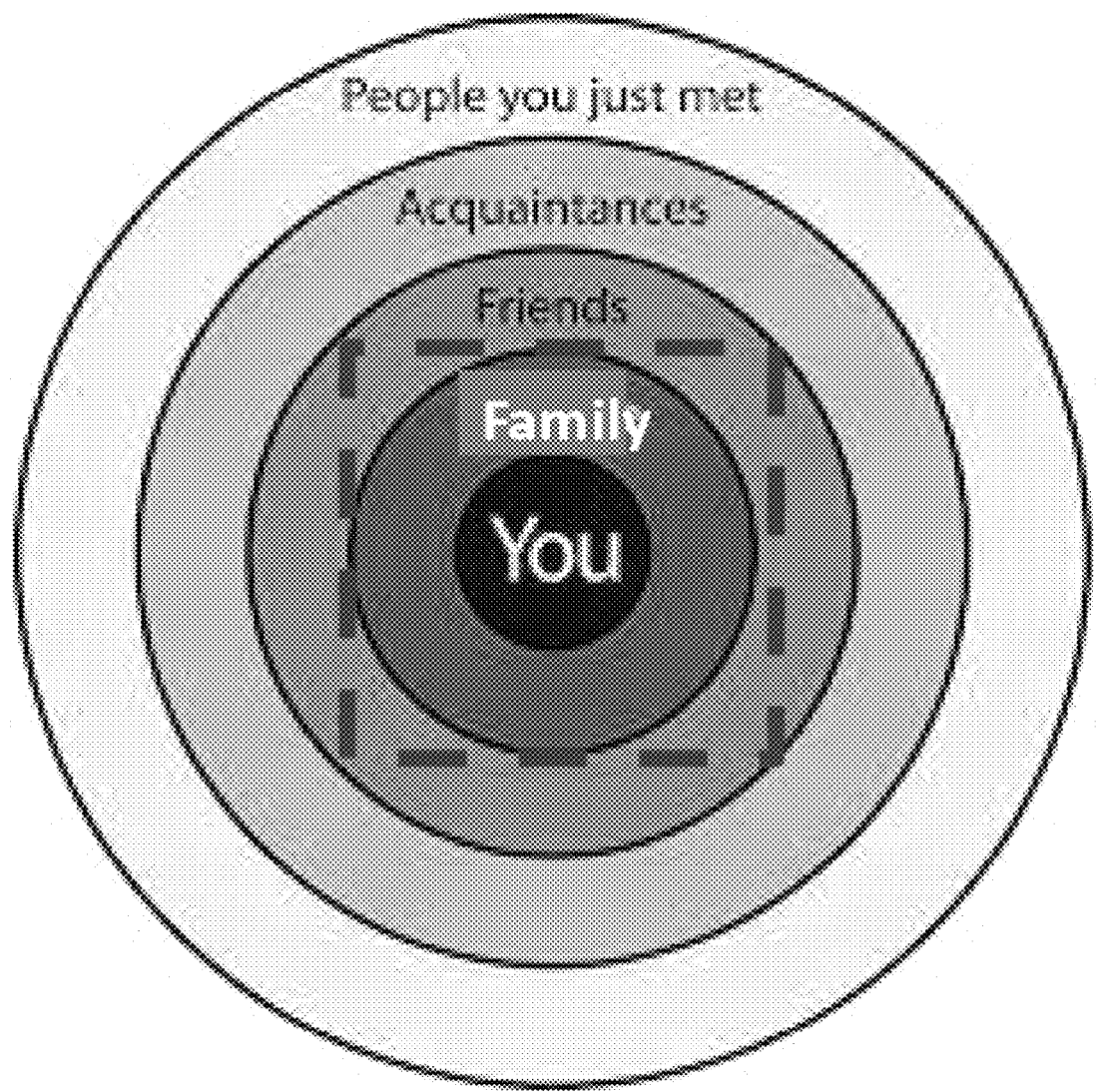
FIG. 5 illustrates the different hierarchies of users in accordance with embodiments of the present invention.

FIG. 5 illustrates the user class-based hierarchy of access that is provided by the herein disclosed systems and methods. As shown, the most private facilities are provided to individual members of a family ("You"). Restricted access to at least a portion of those facilities may be provided by default or user selection to members of other classes. The family unit is also provided with facilities that are accessible by members of a nuclear family, that is, a family unit that includes one or two parents or other primary caregiver and their children ("Family"). In FIG. 5, access to the family-centric facilities may be restricted with varying levels of access by friends, acquaintances, people you just met, and others.

FIG. 6 is an illustration of the application in action. Illustrated are screenshots of the user interface of the application with respect to different menus that may be provided. For example, menu (i.e. Calendar, Notifications, List, Profile, Family, Settings, Switch Family, and Logout). Provided further is a calendar function along with easy event creation to be shared among the family. The examples provided are in no way meant to be limiting.

FIG. 7 provides further illustrations of the application in action. Illustrated are screenshots of a Reminder system. When a reminder is sent to a user of the system, the user has the ability reply automatically with a reason why they are unable to attend a particular event. The reason given is pushed to respective users and the calendar entry is updated accordingly.

Figure 8:
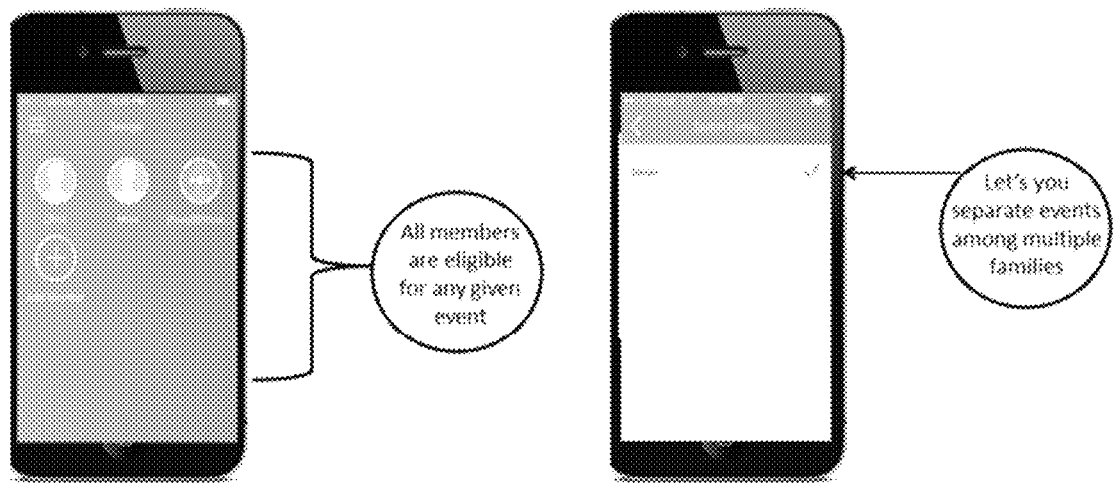

FIG. 8 illustrates the interfaces provided by the application for controlling who should be included in the "Immediate" family group and who should be included in the "Extended" family or "Other" family groups. FIG. 9 provides exemplary interfaces for shared lists control and notifications related to the application. A user of the system can decide to "opt-out" of notifications that may be generated by the application.

FIGS. 10-12 illustrate a further embodiment of the invention. An additional embodiment of the invention provides a module for a rewards component. The rewards component module gamifies everyday events or tasks, like chores (e.g., take out the trash, empty/load dishwasher). It is an object of the invention to increase participation in what are often thought of as otherwise mundane or boring. By providing an incentive, family logistics may be improved. In a non-limiting example, an administrator (i.e. a parent) can assign points to a certain event or task to be completed. The administrator also has the ability to assign a certain event or task to a specific member. In an alternative embodiment, events or tasks can be left unassigned. Upon completion of a task, a member earns the points associated with the event or task. The points may be redeemed for rewards or stored in a member's reward account. Points stored in the member's account can be redeemed at a later time. Earned points can be converted to currency (cash), a redeemable gift card or pre-loaded credit card, or spent via a mobile payment system (e.g., GOOGLE WALLET or APPLE PAY). Additional rewards include non-payment types, like where or what the family will eat for dinner on a given night of the week. The module further includes an allowance component wherein a family member must accumulate a set amount of points in order to earn their allowance for a certain time period (e.g., month, week) as determined by the administrator.

Figure 13:

FIG. 13 is an illustration of a particular default workspace, a virtual kitchen, which would be provided for the use of a registered family. As shown, the kitchen includes modules for managing activities and events that commonly occur or are managed in a family's real kitchen. Those events may include, for example, displaying family photos, maintaining a chart of jobs such as who is responsible for particular household chores, maintaining a to-do list, handling bills and other mail, maintaining and coordinating calendars for family members. Calendared events may include, for example, birthdays, scholastic sports and other school events, doctor appointments, regularly scheduled meetings, and the like. Means may also be provided in the virtual kitchen for maintaining family keepsakes, pictures, carpool lists, rosters, loyalty cards, coupons, and the like. Further, as described previously, an app for handling recipes may also be provided.

Figure 14:
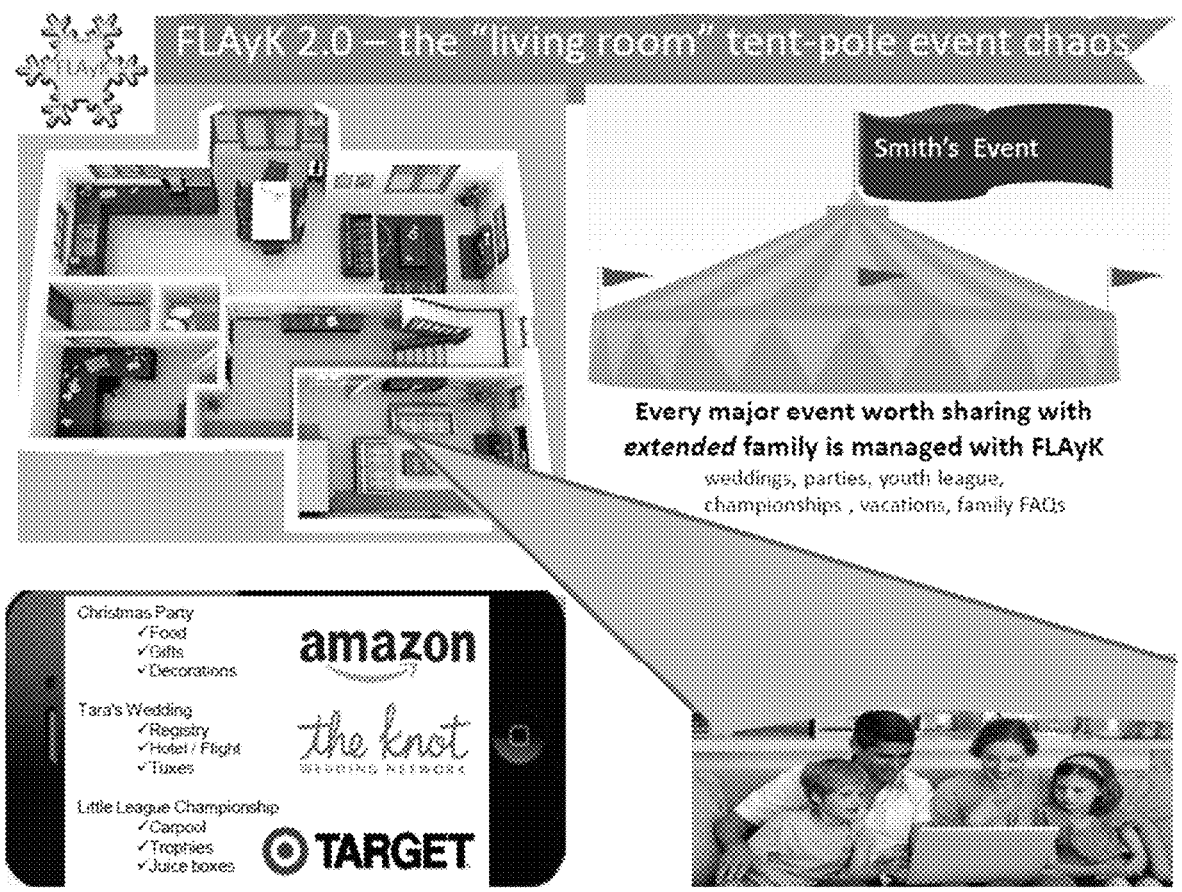
Figure 15:
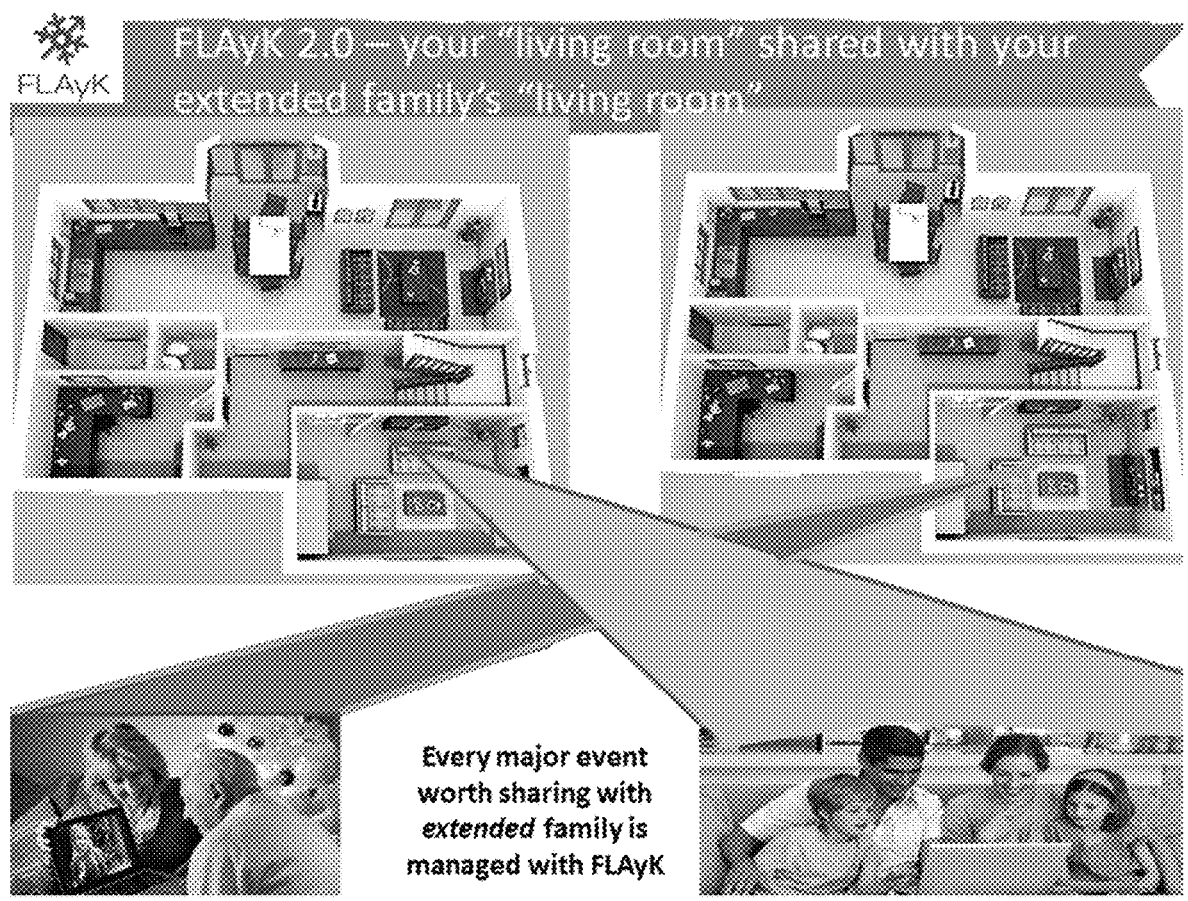

FIG. 14 is an illustration of another particular default workspace, a virtual living room, which would be provided for the use of a registered family. As shown, the living room includes modules for managing activities and events that commonly occur or are managed in a family's real world living room. Those events may include, for example, family video conferences, such as with absent family members, extended family, or friends of the family. Mechanisms may be provided for managing affairs such as weddings, parties, youth league championships, vacations, and the like. In cases where gifts may be exchanged, such as for weddings and holiday parties, means may be provided for identifying and obtaining preferred gifts as well as the tracking or status of such gifts. Additionally, the ability to suggest or obtain retailer fulfillment support in procuring, supplying, and/or purchasing gifts or other items needed to facilitate or participate in an event may be provided. For example in an embodiment, the system may include support for a third party, such as a retailer, an event planner, or the like, to sponsor and/or facilitate a family's events in exchange for a discount or other benefit to some or all of the family members. Illustratively, Amazon may agree to sponsor all of a nuclear family's living room events; and in exchange all nuclear and extended family members participating in the event may receive membership to Amazon Prime for free, or for a reduced cost, or for a limited time, for example. Other major events that may be shared among the extended family and beyond may be similarly managed using the herein disclosed systems and methods. FIG. 15 illustrates that the living room may be shared in predefined and preconfigured aspects with members of the extended family.

Figure 16:
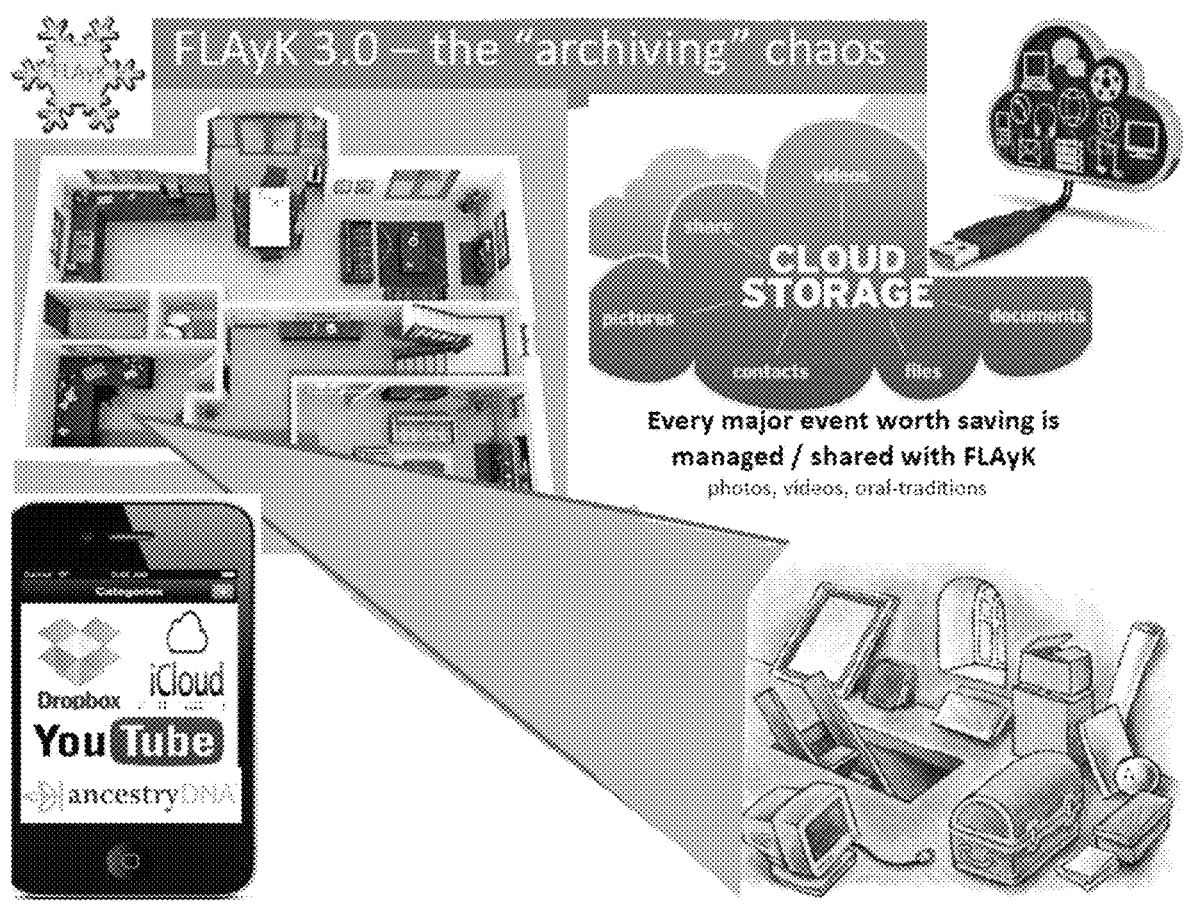

FIG. 16 is an illustration of yet another particular workspace, a virtual storage area, which may be provided for the use of a registered family. As shown, the storage area includes modules for storing pictures, videos, documents, and other files. In an embodiment, the storage area can be configured with its own dedicated storage resources. An interface may be provided for transferring or copying files from another web-based location such as from DROPBOX, ICLOUD, YOUTUBE, ANCESTRY.COM, and the like. Alternatively or in addition, interfaces may be provided within the system for organizing one or more such other web-based locations to make them accessible from within the system framework.

FIG. 17 is an illustration of an embodiment that includes a particular default selection of workspaces representing a particular default household. Each workspace is provided with a default selection of predefined, preconfigured apps. In an embodiment, the default selections and configurations may not be modified by the user. In other embodiments, user control over at least some of the aspects of at least some of the defaults may be modified to reflect or otherwise suit a family's real world situation. Moreover, in embodiments, additional workspaces (not shown) may be selected by a user and included in the household configuration. Those workspaces similarly have a default predefined and preconfigured condition that may or may not be modifiable by a user. As shown in FIG. 8, the illustrated default household includes the following default workspaces and apps. A virtual office is provided, with an app for paying bills. A bedroom is provided for each family member with a personal organizer app. A garage workspace is provided that includes an online auction app or an interface to a third party online auction, such as eBay for example. A laundry room is provided that includes an app for managing dry cleaning activities. A bathroom is provided that includes an app for managing medicines and prescriptions. One aspect of the family presence on the system is that the parents are provided with access to all of the household resources sufficient to provide for parental monitoring of the virtual household.

Figure 18:
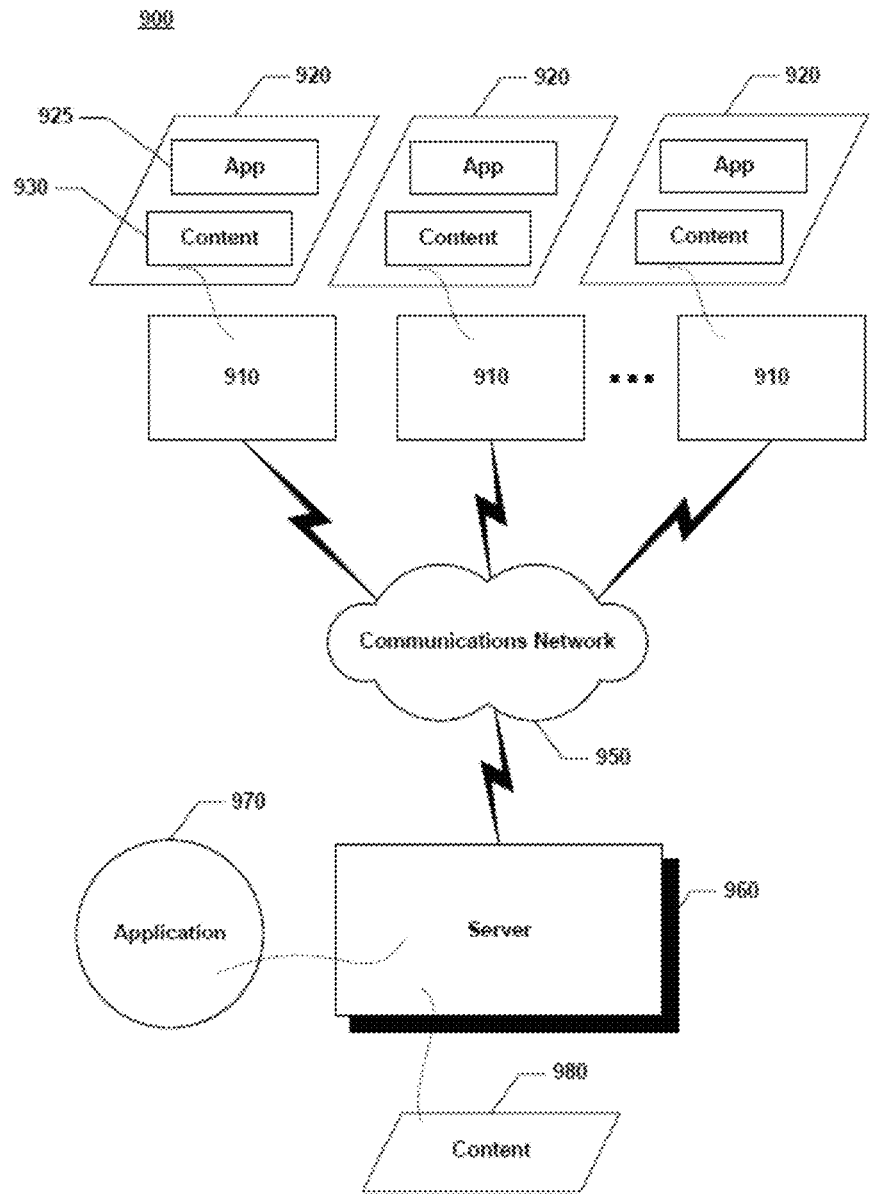
FIG. 18 is a block diagram representing an exemplary device configuration of the present invention.

FIG. 18 is a block diagram showing components of the herein described system in an exemplary embodiment, 900. The system includes a plurality of user terminals, 910, each of which includes at least one storage device 920. Each storage device stores at least one app, 925, and user-specific content 930, such as personal files of the user. In general, a user terminal may store and execute a plurality of apps, including an app to access the virtual family household such as a web browser, an app that provides functionality associated with a workspace of the virtual household, and a third party app, such as apps for participating in voice and video phone calls and conferences, and sending and receiving emails, text messages, videos, and the like. In an embodiment, the system may provide one or more mechanisms by which the system may be accessed from within the third party app, or in a manner that does not interfere with the operation of the other app. Such apps 925 may execute on a processor of the user terminal 910, on a processor of system server 960, or both in cooperation, or in combination with other networked resources.

The user terminals communicate with each other and with system server 960 via communications network 950, which may include the Internet, the public switched telephone network (PSTN), cellular data system, wifi access points, and the like. Access to networked resources from a user terminal may be continuous or intermittent.

System server 960 includes or provides access to content storage device 980 and application storage 970. Content 980 may include information of a family provided by the family; definitions of workspaces and default configurations of workspaces for use in setting up virtual households as described herein; and instances of virtual households and any modifications to respective virtual households set up by respective families. The applications 970 may include the system framework, apps that are provided in conjunction with workspaces for the use of families. Such apps may be downloaded via server 960 and executed on user terminals 910 as apps 925, or may be executed on a processor of server 960 remotely from and accessible to user terminals 910, or both in combination.

Figure 19:
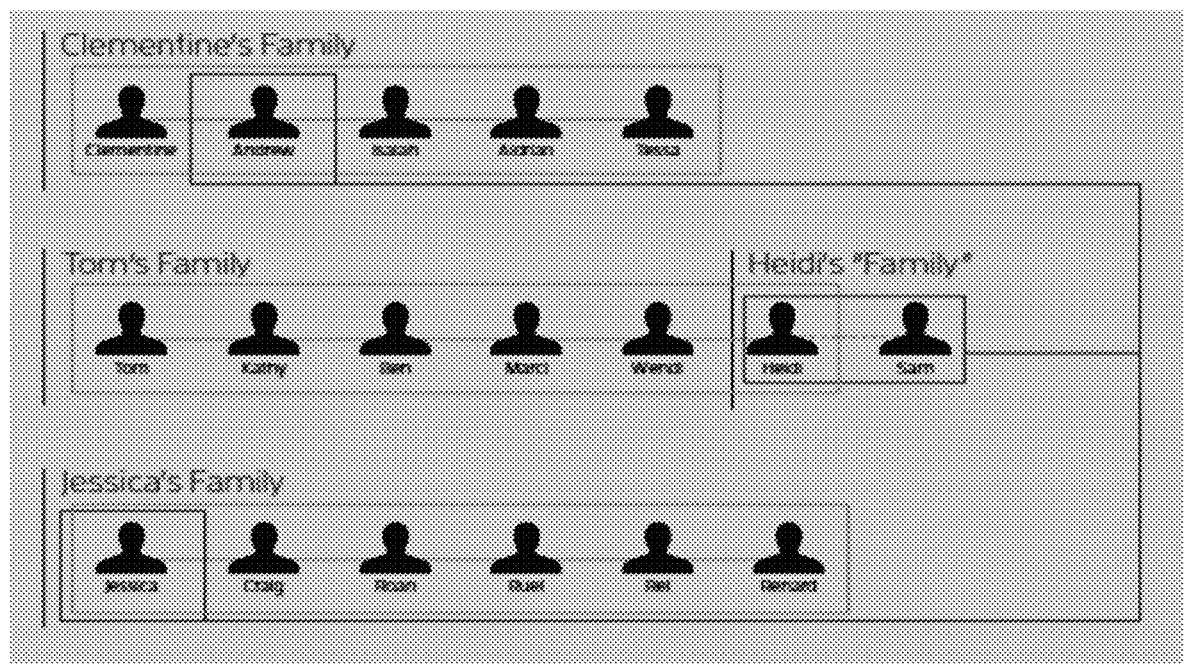
FIG. 19-20 is a graphical representation of hierarchical groups in accordance with the present invention.

FIG. 19 illustrates a plurality of virtual nuclear family households comprising nuclear family members, all of which are inter-related in extended family relationships. As shown, each of the individual nuclear family members has unrestricted access to the system resources pertaining to their own online presence and the presence of their own respective virtual household. In addition, those same individuals are members of the extended family with regard to other nuclear families. As such, extended family members have restricted access to certain resources of other nuclear families. For example, Andrew, a member of Clementine's nuclear Family (top of the diagram) has access to certain shared resources of Tom's nuclear family (center of the diagram), and the nuclear family of Tom's wife Heidi and his step son Sam (Andrew's ex-wife and his biological son) Andrew also has restricted access to certain shared resources of Jessica' nuclear family (bottom of the diagram), and of certain aspects of Jessica's own workspace.

Figure 20:
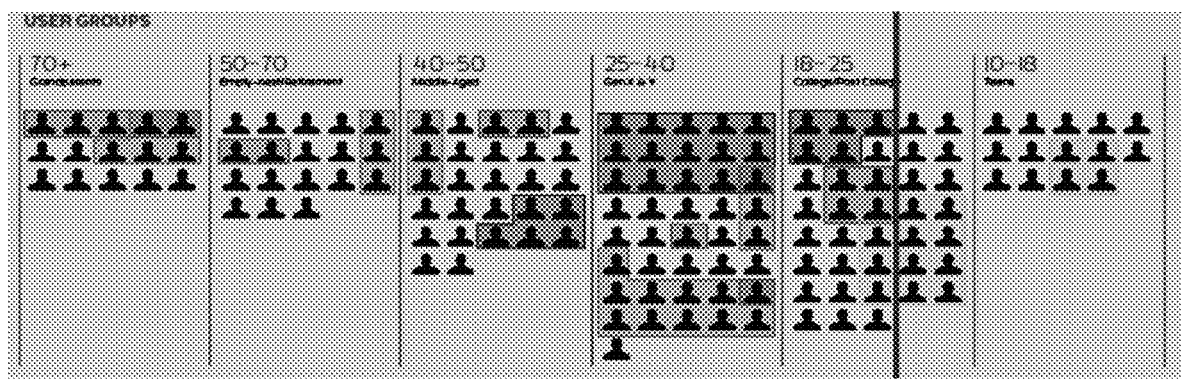

FIG. 20 illustrates that the herein disclosed systems and methods have resources appropriate for the use of family members of different generations, and for communication between generations. Different system facilities are represented by different shades of gray. As shown, certain facilities may appeal to users of different generations as well as to users within a generation. Those facilities may facilitate communication between generations, keeping them better informed about each other and strengthening family ties.

Figure 21:
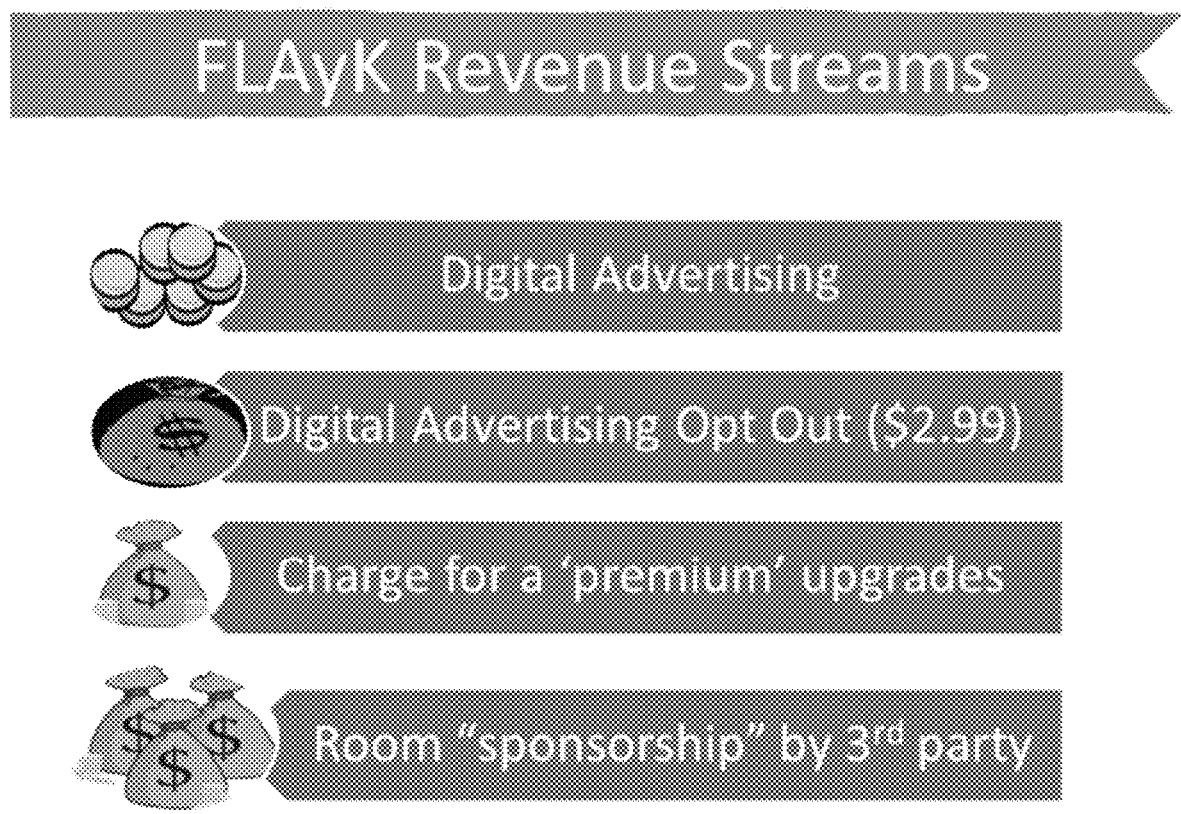
FIG. 21 is a graphical representation of revenue streams for the present invention.

FIG. 21 illustrates aspects of the system pertaining to revenue generation. Different system facilities may be suitable for more than one means of generating revenue. Conversely, the same means of generating revenue may be suitable for more than one facility. As shown, exemplary revenue generating means include digital advertising, which may include an opt-in feature, or be tied to a paid subscription level, for example. Fees may be charged for the use of specific system resources, such as fees for downloading apps and other files, fees for storing family files, and the like. Fees may also be charged for various system levels that include the use of different or additional apps, features, resources, and the like, of the system. A basic functionality "freemium" level of use may be provided for free or for a nominal fee, with increasing fees for increasing capabilities. Such capabilities may be charged individually, or may be grouped into levels that include a plurality of increased capabilities with each higher level.

In addition, revenue may be generated by room "sponsorship" programs, whereby a third party may pay for use of some aspects of the system by others. For example, an employer may pay for access to the system for employees as a benefit of employment. Or, an online "family" presence may be established for a non-profit organization and paid for by a benefactor. Or an established online retailer may agree to sponsor some or all of the user base's family events knowing such events/families will be in need of transactions that the retailer can fulfill without having members leave their living room/App. This ease of participation by family members to activate the goods and services of the sponsoring retailer would be welcomed by the App users in exchange for value add incentives from the sponsoring retailer such as free shipping or discounts.

Figure 22:
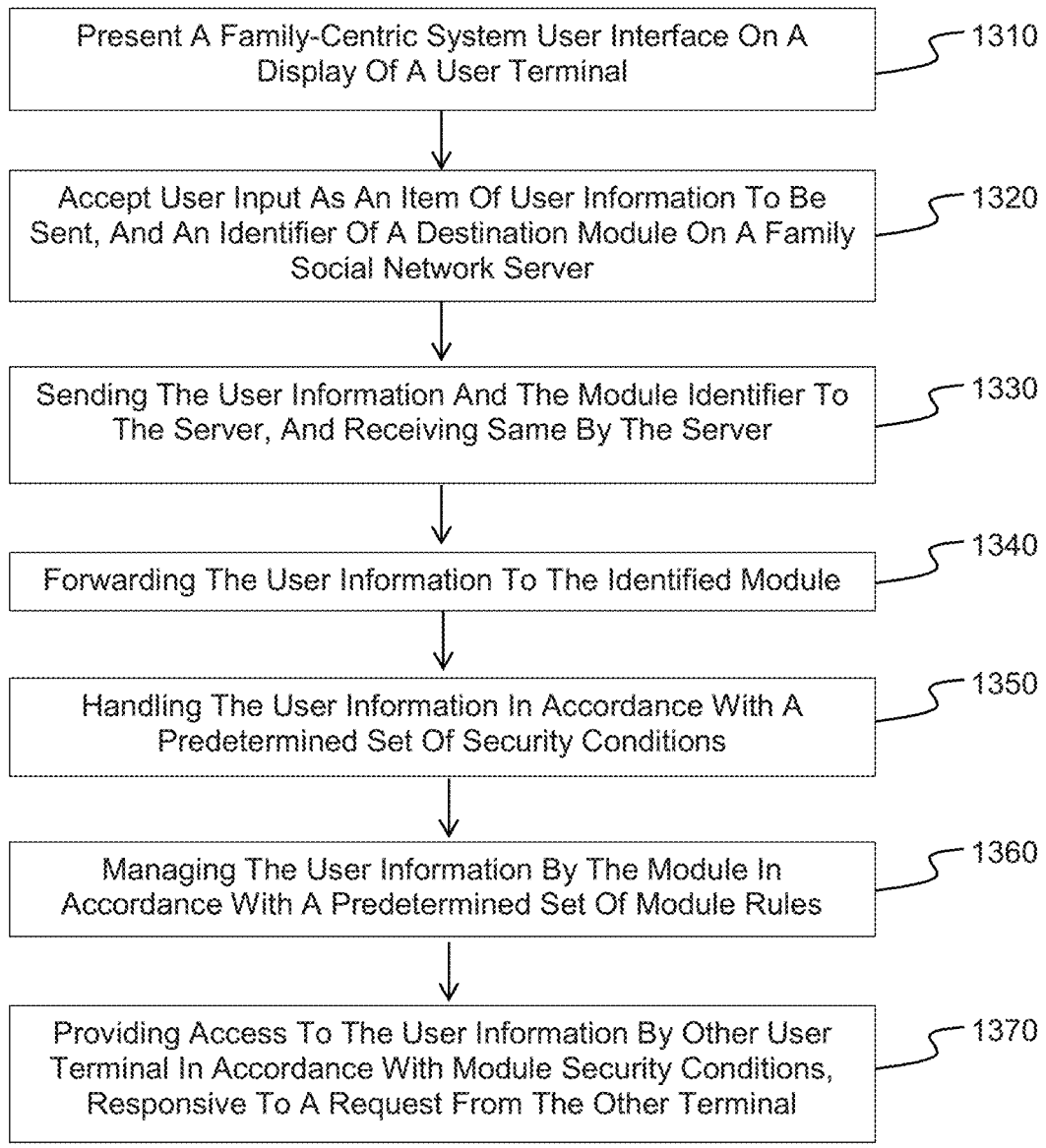
FIG. 22 is a flow diagram showing a method performed by an exemplary embodiment in accordance with the disclosure.

FIG. 22 shows a generalized exemplary method of handling family information performed by an embodiment of the herein disclosed system, such as the system illustrated in FIG. 9. In setting up and using a virtual household, a nuclear family member's user terminal presents a family-centric system user interface on a display of the user terminal, 1310. The user terminal then accepts user input as an item of user information to be sent by the user terminal. The user information can be, for example, information to be stored in a user profile, or a message to one or more other nuclear family members. The information is associated with an identifier of a destination module on a system server, 1320. The user information and module identifier are sent by the user terminal, and are received by the server, 1330. The user information is forwarded to the identified module, 1340. The user information is handled in accordance with a predetermined set of module security conditions, 1350, and managed in accordance with a predetermined set of module rules, 1360. Thereafter, access to the user information may be provided to another user's terminal in accordance with the module security conditions, responsive to a request from the other terminal.

This generalized method can be followed while setting the system up initially, and can also be used to facilitate communications between family members. For example, a family's schedule of events can be set up by a user in accordance with the method. One event might be, for example, a soccer game a child of the family is playing in. Information of arrangements for a parent or ex-spouse to transport the player and others of the family that will be in attendance may also be stored in the system, for example using a calendar app. Thereafter, an unforeseen event may occur that will cause a disruption in the transportation arrangements, for example, the parent and car that were to handle the transport may have been involved in a fender bender shortly before the planned departure time. A message can then be sent by the driver and distributed by the system to the rest of the nuclear family informing them that the accident has occurred in accordance with a predefined and preconfigured mechanism. An alternative travel plan may then be swiftly arranged in an online family conference facilitated by the system using an online family conference facility of the system, again in accordance with a predefined and preconfigured mechanism.

Although the herein disclosed systems and methods have been described and illustrated in exemplary forms with a certain degree of particularity, it is noted that the description and illustrations have been made by way of example only. Numerous changes in the details of construction and combination and arrangement of parts and steps may be made, as will be apparent to those of ordinary skill in the pertinent arts in view of the disclosure herein. Accordingly, any such changes are intended to be included within the scope the invention, as defined by the claims appended hereto.

What is claimed is:

1. A computer-based Internet-enabled system for facilitating family-centric communications and management, comprising:
   a user terminal with a hardware processor in data communication with a network interface that communicatively couples the user terminal to a network, the processor further in data communication with a data storage device storing instructions which, when executed on the processor, cause the user terminal to implement a family-centric social networking app that performs a method including:
      presenting a family-centric system user interface on a display of the user terminal;
      accepting user input as an item of user information to be sent, and an identifier of a destination module on a family social network server to manage the sent information, wherein the destination module is one of a plurality of modules that include at least one gamifying rewards component module that gamifies data related to at least one family activity on the server;
      filtering at least the user information and the module identifier onto the family social network server; and
   the server, having a hardware server processor in data communication with a server network interface that communicatively couples the server to the data communication network, the server processor further in data communication with a server data storage device storing instructions which, when executed on the server processor, cause the server to perform a method including:
      receiving from the user terminal the user information and the module identifier;
      forwarding the user information to the identified module;
      storing the user information in accordance with a predetermined set of module security conditions;
      handling the user information by the module in accordance with a predetermined set of module rules; and
      providing access to the user information by at least one other user terminal in accordance with the module security conditions, responsive to a request from the at least one other terminal.

2. The system of claim 1, Wherein the modules are prearranged to mimic familiar interactions of a family household, and include a default selection of preconfigured modules as metaphorical virtual versions of a kitchen, a living room, a bedroom, and a visitor area.

3. The system of claim 2, wherein the kitchen is accessible only to members of a nuclear family, preconfigured to provide familiar functionality commonly associated with a tangible kitchen, including:
   a shared calendar that maintains family members' schedules in a predefined and preconfigured manner;
   a messaging service that provides alerts and reminders and opt out capabilities to the family members regarding unscheduled events in a predefined and preconfigured manner;
   a cooking app that lets users store, search, and manipulate recipes and adjust the recipes for a select number of diners in a predefined and preconfigured manner.

4. The system of claim 2, wherein the living room provides:
   a first living room function in a predefined and preconfigured manner; and
   a second living room function in a predefined and preconfigured manner.

5. The system of claim 2, wherein the bedroom provides a separate bedroom for each member of the nuclear family that provides:
   a first private bedroom function in a predefined and preconfigured manner; and
   a second private bedroom function in a predefined and preconfigured manner.

6. The system of claim 2, wherein the visitor area provides:
   a first visitor area function in a predefined and preconfigured manner; and
   a second visitor area function in a predefined and preconfigured manner.

7. The system of claim 1, wherein:
   on the user terminal:

the user interface on the display of the user terminal includes a user interface of a third party app extended by the family-centric social networking app; and the user terminal sends information of the third party app to the server in addition to the user information and the module identifier; and the method performed by the server further includes:

receiving from the user terminal the information pertaining to the third party app; and interacting with a third party app server that provides access to third party app services via an application programming interface (API) of the third party app.

8. The system of claim 7, wherein the third party app is another social network.

9. The system of claim 2, wherein at least one of the modules includes a rewards component, further comprising:

wherein a user of the user terminal assigns via the user interface at least one task to a user of the one other terminal, wherein a credit amount is associated with the assigned task; and wherein the credit amount associated with the assigned task is applied to an account of the user of the one other terminal upon completion of the assigned task.

10. The system of claim 9, wherein the rewards component further includes at least one unassigned task;

wherein a credit amount is associated with the at least one unassigned task;

the credit amount associated with the at least one unassigned task is applied to the account of the user of the one other terminal upon completion of the unassigned task;

wherein applied account credits are used for at least one of: pre-assigned rewards, conversion to currency, or usable towards a mobile payment system.

* * * * *